(12) United States Patent
Silver et al.

(10) Patent No.: US 10,762,360 B2
(45) Date of Patent: Sep. 1, 2020

(54) AUTOMATICALLY DETECTING UNMAPPED DRIVABLE ROAD SURFACES FOR AUTONOMOUS VEHICLES

(71) Applicant: Waymo LLC, Mountain View, CA (US)

(72) Inventors: David Harrison Silver, San Carlos, CA (US); Ivan Bogun, San Jose, CA (US); Romain Thibaux, Fremont, CA (US)

(73) Assignee: Waymo LLC, Mountain View, CA (US)

( * ) Notice: Subject to any disclaimer, the term of this patent is extended or adjusted under 35 U.S.C. 154(b) by 103 days.

(21) Appl. No.: 16/194,632

(22) Filed: Nov. 19, 2018

(65) Prior Publication Data

US 2020/0160068 A1 May 21, 2020

(51) Int. Cl.
*G06K 9/00* (2006.01)
*G06K 9/62* (2006.01)
*G05D 1/02* (2020.01)

(52) U.S. Cl.
CPC ....... *G06K 9/00798* (2013.01); *G05D 1/0212* (2013.01); *G05D 1/0231* (2013.01); *G06K 9/6218* (2013.01); *G06K 9/6262* (2013.01); *G05D 2201/0213* (2013.01)

(58) Field of Classification Search
CPC ............. G06K 9/00798; G06K 9/6218; G06K 9/6262; G05D 1/0212; G05D 1/0231; G05D 2201/0213
See application file for complete search history.

(56) References Cited

U.S. PATENT DOCUMENTS

| | | | |
|---|---|---|---|
| 8,773,535 B2 | 7/2014 | Zhang | |
| 9,077,958 B2 | 7/2015 | Gupta et al. | |
| 9,971,946 B2 | 5/2018 | Ito | |
| 2016/0232412 A1 | 8/2016 | Nishijima | |
| 2019/0164018 A1* | 5/2019 | Zhu | G06K 9/40 |
| 2019/0310644 A1* | 10/2019 | Zhang | G01C 21/3461 |
| 2019/0339709 A1* | 11/2019 | Tay | G05D 1/0088 |

\* cited by examiner

*Primary Examiner* — Brenda C Bernardi
(74) *Attorney, Agent, or Firm* — Botos Churchill IP Law

(57) ABSTRACT

Aspects of the disclosure relate to detecting unmapped drivable road surfaces. In one instance, sensor data captured by a sensor of an autonomous vehicle may be projected onto a grid having a plurality of cells. The plurality of cells may be classified by generating a label for each of the plurality of cells. Each label may identifies whether or not a corresponding cell contains a drivable surface. Ones of the plurality of cells may be clustered based on the labels to form a cluster of cells. An area of the cluster of cells may be compared to a map. Whether the area of the cluster of cells is an unmapped drivable road surface may be determined based on the comparison.

20 Claims, 11 Drawing Sheets

|   | 1 | 2 | 3 | 4 | 5 | 6 |
|---|---|---|---|---|---|---|
| W | ↑ Lane | ↑ Lane | ↑ Lane | Not Drivable | Not Drivable | Not Drivable |
| X | ↑ Lane | ↑ Lane | ↑ Lane | Not Drivable | Not Drivable | Not Drivable |
| Y | ↑ Lane | ↑ Lane | ↑ Lane | Not Drivable | Not Drivable | Not Drivable |
| Z | ↑ Lane | ↑ Lane | ↑ Lane | Not Drivable | Not Drivable | Not Drivable |

AUTOMATICALLY DETECTING UNMAPPED DRIVABLE ROAD SURFACES FOR AUTONOMOUS VEHICLES

BACKGROUND

Autonomous vehicles, such as vehicles which do not require a human driver when operating in an autonomous driving mode, may be used to aid in the transport of passengers or items from one location to another. An important component of an autonomous vehicle is the vehicle's map information. This information is critical to allowing the vehicle's computing systems to localize itself and to make appropriate driving decisions for the vehicle. Thus, for vehicles which depend on maps to make driving decisions, it is critical that these maps are kept up to date and accurate. In this regard, changes to the world that make the map out of date or stale, such as when vehicle approaches an entire region of drivable road surface that is not reflected in the map can be extremely concerning. This can occur when a road, lane, driveway, alleyway, etc., is either not included in the original map or is added after the map is built.

Typical approaches for identifying changes to an already mapped road surface, for instance by looking for new or moved lane lines, etc., are simply not capable of detecting new driving surfaces. Other approaches, for instance, such as those that may involve identifying new traffic lights, may not provide sufficient information or context about the surrounding area. This can result in an autonomous vehicle not properly anticipating where another vehicle may come from or where another vehicle may drive into. In turn, these prediction errors can have safety consequences.

BRIEF SUMMARY

Aspects of the disclosure provide a method of detecting unmapped drivable road surfaces. The method includes projecting, by one or more processors, sensor data captured by a sensor of an autonomous vehicle onto a grid having a plurality of cells; classifying, by the one or more processors, the plurality of cells by generating a label for each of the plurality of cells, each label identifying whether or not a corresponding cell contains a drivable surface; clustering, by the one or more processors, ones of the plurality of cells based on the labels to form a cluster of cells; comparing, by the one or more processors, an area of the cluster of cells to a map; and determining, by the one or more processors, whether the area of the cluster of cells is an unmapped drivable road surface based on the comparison.

In one example, the sensor data includes LIDAR sensor data. In another example, the sensor data includes camera images. In another example, the classifying includes using a machine learning classifier to generate the labels. In another example, the method also includes classifying, by the one or more processors, the plurality of cells by generating a second label for each of the plurality of cells. Each second label identifies one or more driving directions for a corresponding cell, and wherein the clustering is further based on the second labels. In another example, the method also includes classifying, by the one or more processors, the plurality of cells by generating a second label for each of the plurality of cells. Each second label identifies whether a corresponding cell is part of an intersection, and wherein the clustering is further based on the second labels. In another example, the method also includes classifying, by the one or more processors, the plurality of cells by generating a second label for each of the plurality of cells. Each second label identifies whether a corresponding cell is part of a driveway, and wherein the clustering is further based on the second labels. In another example, the method also includes classifying, by the one or more processors, the plurality of cells by generating a second label for each of the plurality of cells. Each second label identifies whether a corresponding cell is part of a crosswalk, and wherein the clustering is further based on the second labels. In another example, the clustering further includes grouping adjacent cells to form the cluster based on the labels. In another example, the method also includes determining a confidence for each of the labels, and the classifying is further based on the confidences. In this example, the clustering includes grouping together non-adjacent cells to form the cluster based on the confidences. In another example, the clustering includes ignoring one or more labels having confidence levels below a threshold when forming the cluster. In another example, the comparing includes determining an amount of overlap between the area of the cluster of cells and a region of the map having a label identifying whether or not a corresponding cell contains a drivable surface, and determining whether the area of the cluster of cells is an unmapped drivable road surface is further based on the amount of overlap. In this example, when the amount of overlap is not a complete overlap, the area of the cluster of cells is determined to be an unmapped drivable road surface. Alternatively, when the amount of overlap is a complete overlap, the area of the cluster of cells is determined not to be an unmapped drivable road surface. As another alternative, when the amount of overlap is a partial overlap, the method also includes determining that the area of the cluster of cells corresponds to a moved road feature. In another example, the method also includes using the determination to control an autonomous vehicle in an autonomous driving mode. In this example, controlling the autonomous vehicle using the determination includes changing a driving behavior of the autonomous vehicle. In addition or alternatively, the method also includes sending the determination to other vehicles having autonomous driving modes. In another example, the method also includes using the determination as a signal that other unmapped drivable road surfaces may exist in an area proximate to the area corresponding to the area of the cluster of cells.

BRIEF DESCRIPTION OF THE DRAWINGS

FIGS. 2B and 2C are example grids corresponding to areas of the map information of FIG. 2A in accordance with aspects of the disclosure.

DETAILED DESCRIPTION

Overview

Figure 1:
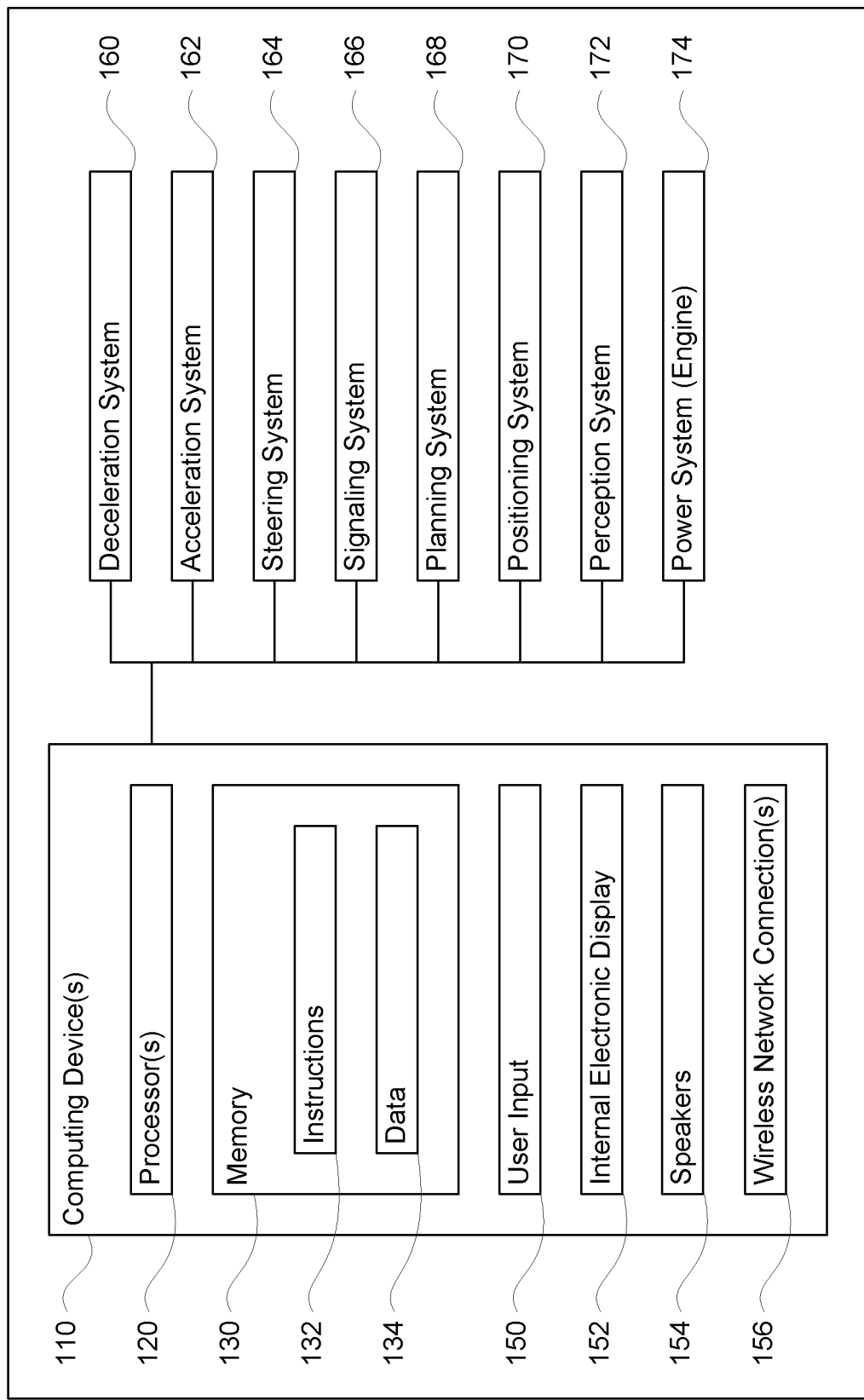
FIG. 1 is a functional diagram of an example vehicle in accordance with an exemplary embodiment.

The technology relates to detecting new drivable road surfaces, such as new roads, driveways, intersections, and other drivable surfaces, for autonomous vehicles. For an autonomous vehicle that depends on maps to make driving decisions, it is critical that these maps are kept up to date and accurate. In this regard, changes to the world that make the map out of date or stale, such as when an autonomous vehicle approaches an entire region of drivable road surface that is not reflected in the map can be extremely concerning. This can occur when a road, lane, driveway, alleyway, etc is either not included in the original map or is added after the map is built.

As noted above, typical approaches for identifying changes to an already mapped road surface, for instance by looking for new or moved lane lines, etc., are simply not capable of detecting new driving surfaces. Other approaches, for instance, such as those that may involve identifying new traffic lights, may not provide sufficient information or context about the surrounding area. This can result in an autonomous vehicle not properly anticipating where another vehicle may come from or where another vehicle may drive into. In turn, these prediction errors can have safety consequences.

To address these issues, an approach that allows an autonomous vehicle to detect changes to or errors in the map may be implemented. The approach may include a plurality of stages. In the first stage, one or more LIDAR scans collected by a LIDAR sensor of the vehicle and/or camera images collected by cameras of the vehicle may be projected onto a grid. The grid and projected data may be input into a model which classifies the cells as to whether or not the cell contains a drivable surface. The model may also classify the cells in other ways, such as one or more potential driving direction of that surface, whether the surface could be an intersection or not, whether the surface is a normal driving lane, driveway, alley, crosswalk, etc. For each label, the model may also provide a confidence or error for that classification.

The model may be a machine learning classifier that is trained "offline" using labeled ground truth information. For instance, the model may be a "large-context" classifier for which input pixels (or cells) affect classified pixels (or cells) which are far away from the input location and may be trained on the map information. In this regard, discrete portions of drivable road surfaces of the map may be labeled as being drivable road surfaces. These portions of drivable road surfaces may also be labeled with other information such as one or more potential driving direction of that surface, whether the surface could be an intersection or not, whether the surface is a normal driving lane, driveway, alley, crosswalk, etc. The map and labels may be used to train the model. In this regard, the model may be trained to output a prediction of the type of surface. The model may then be sent to an autonomous vehicle for use.

In a second stage, the output predictions of the model then be clustered and segmented in order to group together cells into larger regions with similar predictions of driving direction and type of surface. For instance, groups of adjacent cells predicted to be part of an intersection may be clustered together, groups of adjacent cells having a same or similar direction of travel may be clustered together, and so on. In some instances, non-adjacent groups of cells may be clustered depending upon the confidence in the predictions. If the number of cells in a given cluster would be too few, these clusters may be "ignored" or filtered.

In a third stage, the clusters may be compared to the map to determine whether a drivable surface exists in the map with the same or similar labels at the location of the clustered cells. For instance, this stage may determine whether there is an overlap between the cells of the clusters and the labels of the corresponding region in the map. This overlap may be a complete or a partial overlap, and in this way, the sensitivity of the approach may be tuned. If there is an overlap, this may indicate no or very little change to the map. In the alternative, if there is no overlap, this may indicate that the cluster is an unmapped drivable road surface.

For any unmapped drivable road surfaces, the autonomous vehicle's computing devices may implement an appropriate reaction, for instance by changing the behavior of the autonomous vehicle. This may include, for instance, slowing down, stopping, pulling over, acting more cautiously, etc. In addition, the vehicle's computing devices may begin to search sensor data for the location of the unmapped drivable road surface in order to identify any vehicles that may be approaching the vehicle from the unmapped drivable road surface.

The features described here provide a more robust approach for detecting unmapped drivable surfaces than simply looking for missing or moved map features. This, in turn, increases the safety and effectiveness of the vehicle's computing devices, as these devices and make driving decisions related to an unmapped drivable road surface or a changed portion of the map. In addition, this approach allows an autonomous vehicle's computing devices to detect an unmapped drivable road surface and/or a changed portion of the map before the vehicle has actually reached these locations. Moreover, the approach also allows an autonomous vehicle's computing devices to make these determinations in real time and to share them with other vehicles, thereby increasing safety more generally.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle in order to control the vehicle in an autonomous driving mode. For example, returning to FIG. 1, computing device 110 may be in communication with various systems of vehicle 100, such as deceleration system 160, acceleration system 162, steering system 164, signaling system 166, planner system 168, positioning system 170, and perception system 172 in order to control the movement, speed, etc. of vehicle 100 in accordance with the instructions 134 of memory 130 in the autonomous driving mode. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Planner system 168 may be used by computing device 110 in order to determine and follow a route to a location. In this regard, the planner system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information.

Figure 2A:
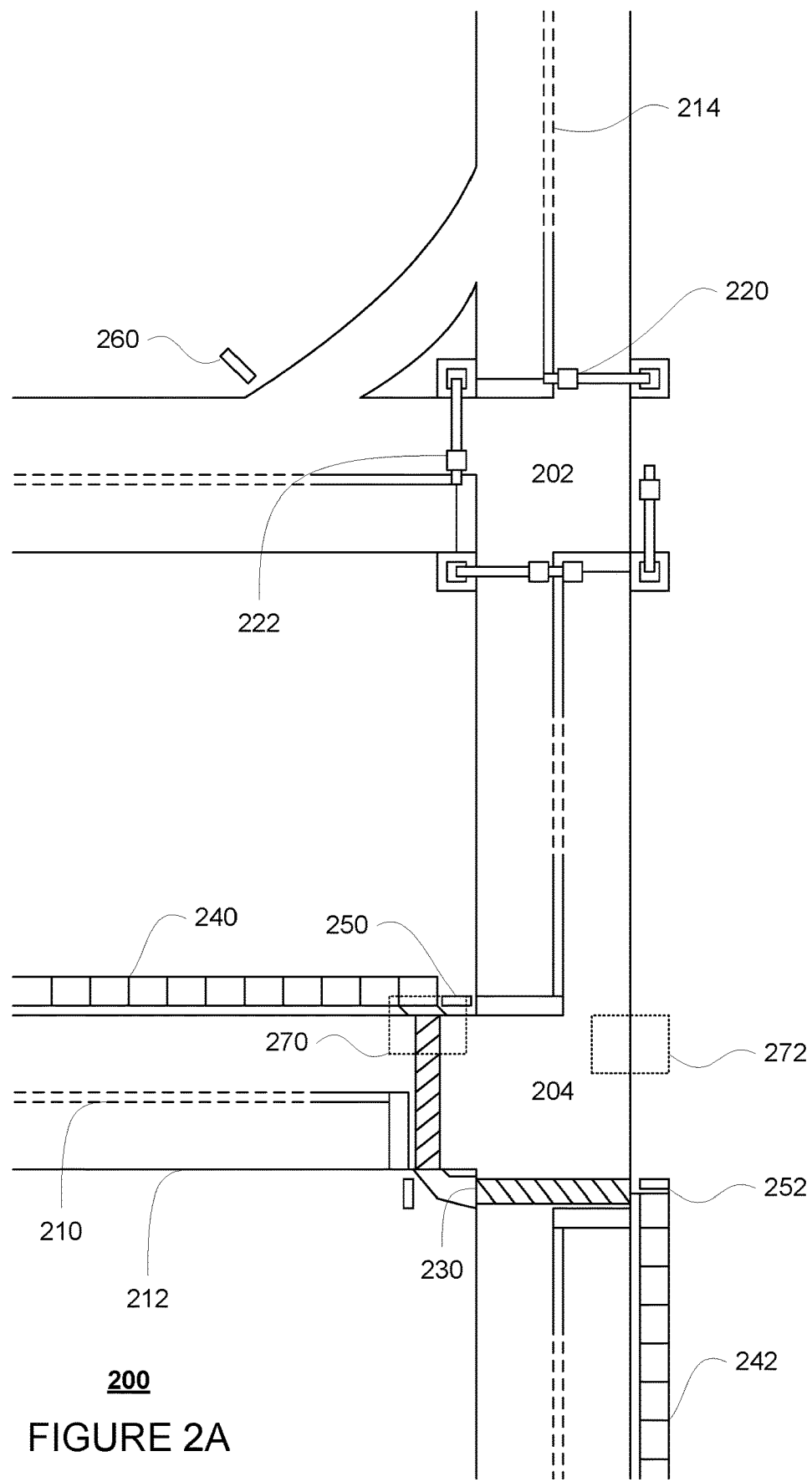
FIG. 2A is an example of map information in accordance with aspects of the disclosure.

FIG. 2A is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, crosswalk 230, sidewalks 240, 242, stop signs 250, 252, and yield sign 260. In this regard, the map information includes the three-dimensional (3D) locations of traffic lights 220, 222.

In addition, discrete portions of the map information may be associated with labels. For instance, the map information may be subdivided into a grid. The cells of this grid may be a fixed value, such as 10, 15, 20, 25, 30, 35 cm or more or less. Each grid cell may be associated with one or more identifiers and labels. These labels may identify the grid cells as a drivable road surface or not. For the cells identified as drivable road surfaces, the labels may include other information such as one or more potential driving direction of that surface, whether the surface could be an intersection or not, whether the surface is a normal driving lane, driveway, alley, crosswalk, etc. From this information, the computing devices 110 may determine the direction of a given road surface, e.g. a lane, as well as how to control the vehicle when in those lanes (e.g. some lanes may allow the vehicle to only turn right, only turn left, only stay straight, turn right or stay straight, turn left or stay straight, etc.).

Figure 2B:
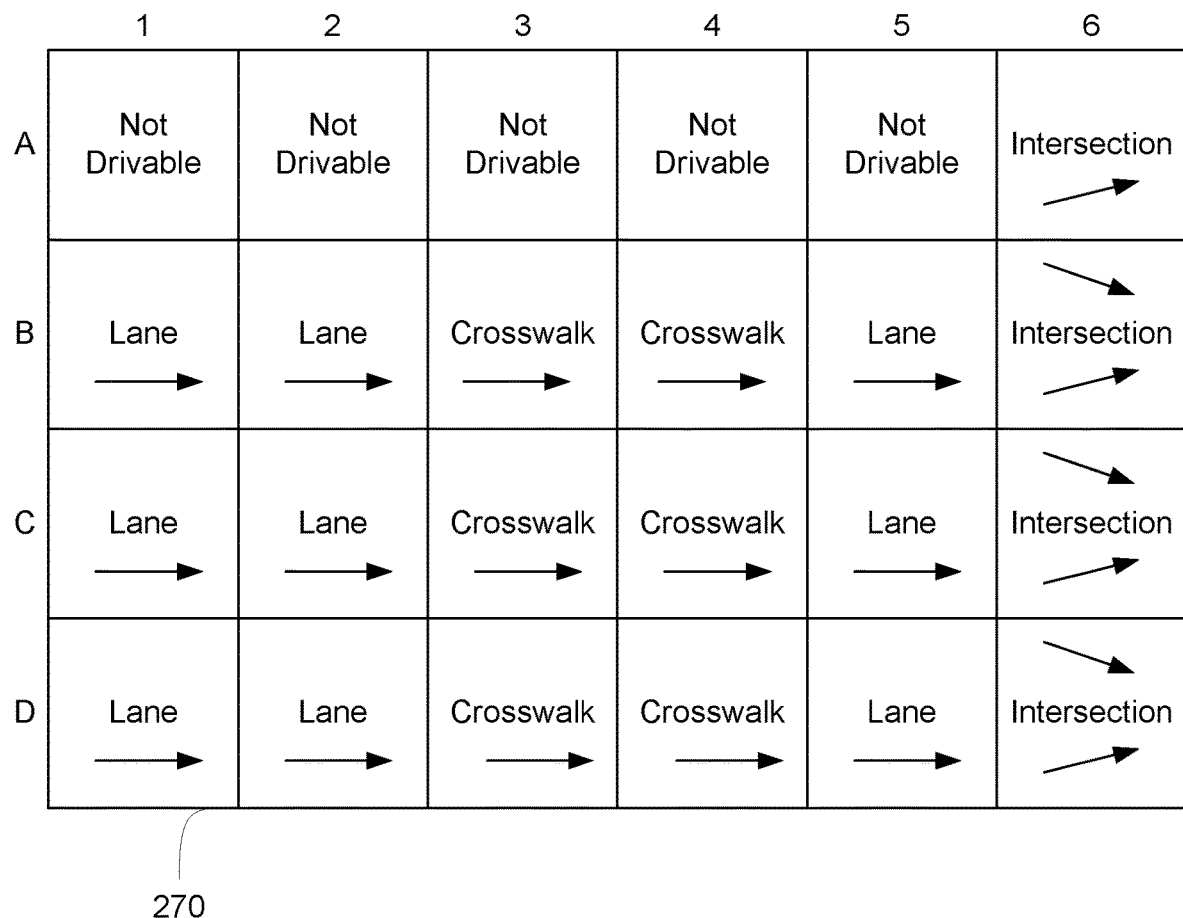

For instance, FIG. 2B represents a grid corresponding to area 270 of FIG. 2A. In this example, each grid cell is identified by a row and column number, for example, A1, A2, etc. though the cells may be identified in the map information by their geographic locations, for instance latitude and longitude coordinates for a particular corner or center point, etc. Each cell includes one or more labels. As an example, grid cells A1, A2, A3, A4, and A5 are labeled as not drivable road surfaces, as these may correspond to an area of a curb or sidewalk 240. Other grid cells corresponding to drivable road surface may be labeled as such, and are shown here as labeled with the type of drivable road surface. For example, grid cells B1, B2, B5, C1, C2, C5, D1, D2, and D5 are labeled as normal driving lanes, grid cells B3, B4, C3, C4, D3, and D4 are labeled as crosswalk, and grid cells A6, B6, C6, and D6 are labeled as intersection. In addition, each grid cell corresponding to drivable road surface may include a direction of travel, here indicated by the arrows.

FIG. 2C represents a grid corresponding to area 272 of FIG. 2A. In this example, each grid cell is identified by a row and column number, for example, W1, W2, etc. though the cells may be identified in the map information by their geographic locations, for instance latitude and longitude coordinates for a particular corner or center point, etc. Each cell includes one or more labels. As an example, cells W4, W5, W6, X4, X5, X6, Y54, Y5, Y6, Z4, Z5, and Z6 are labeled as not drivable road surfaces, as these may correspond to an area of a curb or beyond. Other cells corresponding to drivable road surface may be labeled as such, and are shown here as labeled with the type of drivable road surface. For example, grid cells W1, W2, W3, X1, X2, X3, Y1, Y2, Y3, Z1, Z2, and Z3 are labeled as normal driving lanes. In addition, each cell corresponding to drivable road surface may include a direction of travel, here indicated by the arrows.

Although the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
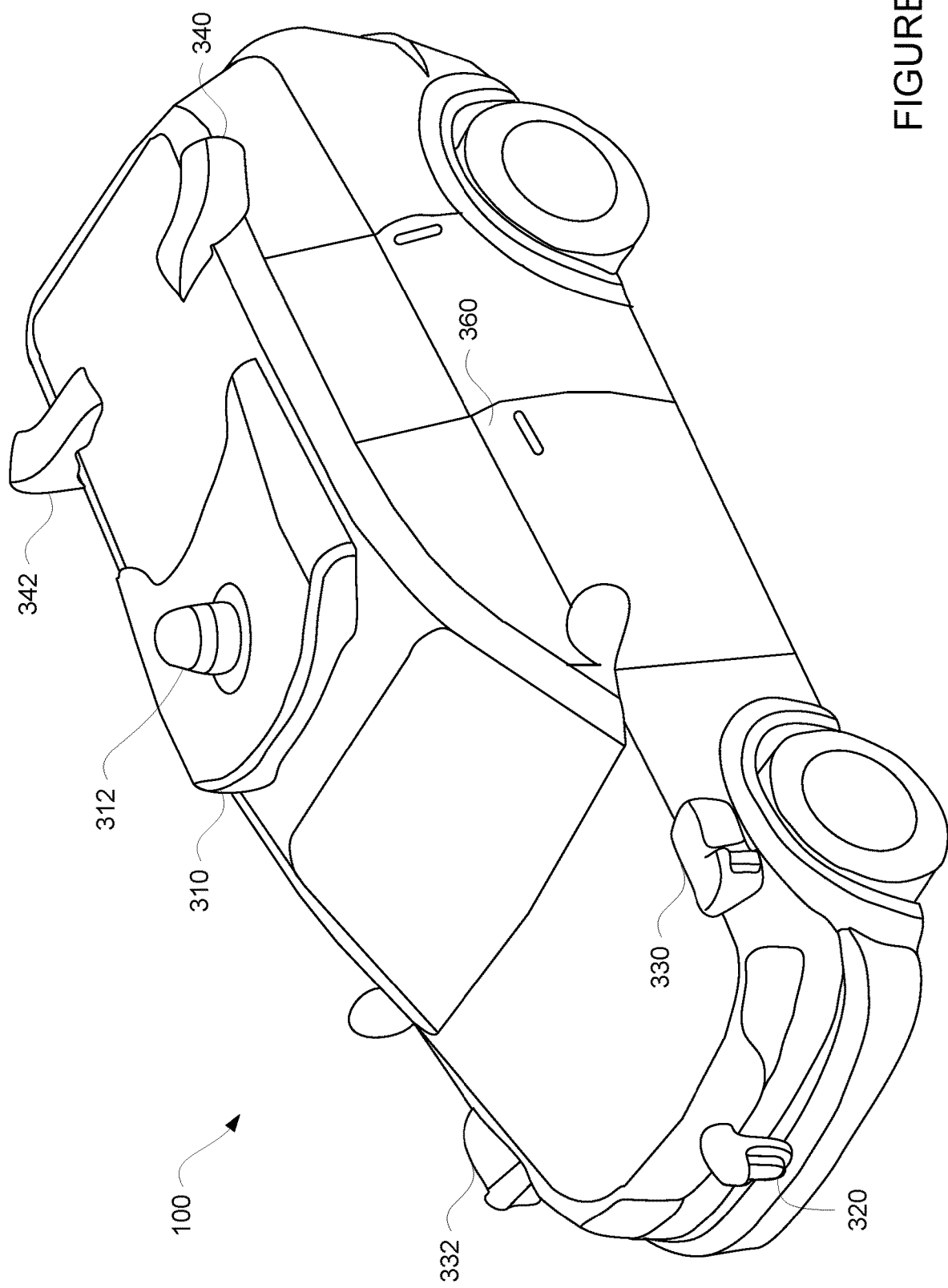
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, planner system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planner system software module of the planner system 168. The planning system and/or computing devices 110 may use this input to generate a route and trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing device 110 may control the vehicle by controlling various components. For instance, by way of example, computing device 110 may navigate the vehicle to a destination location completely autonomously using data from the detailed map information and planner system 168. Computing device 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 4:
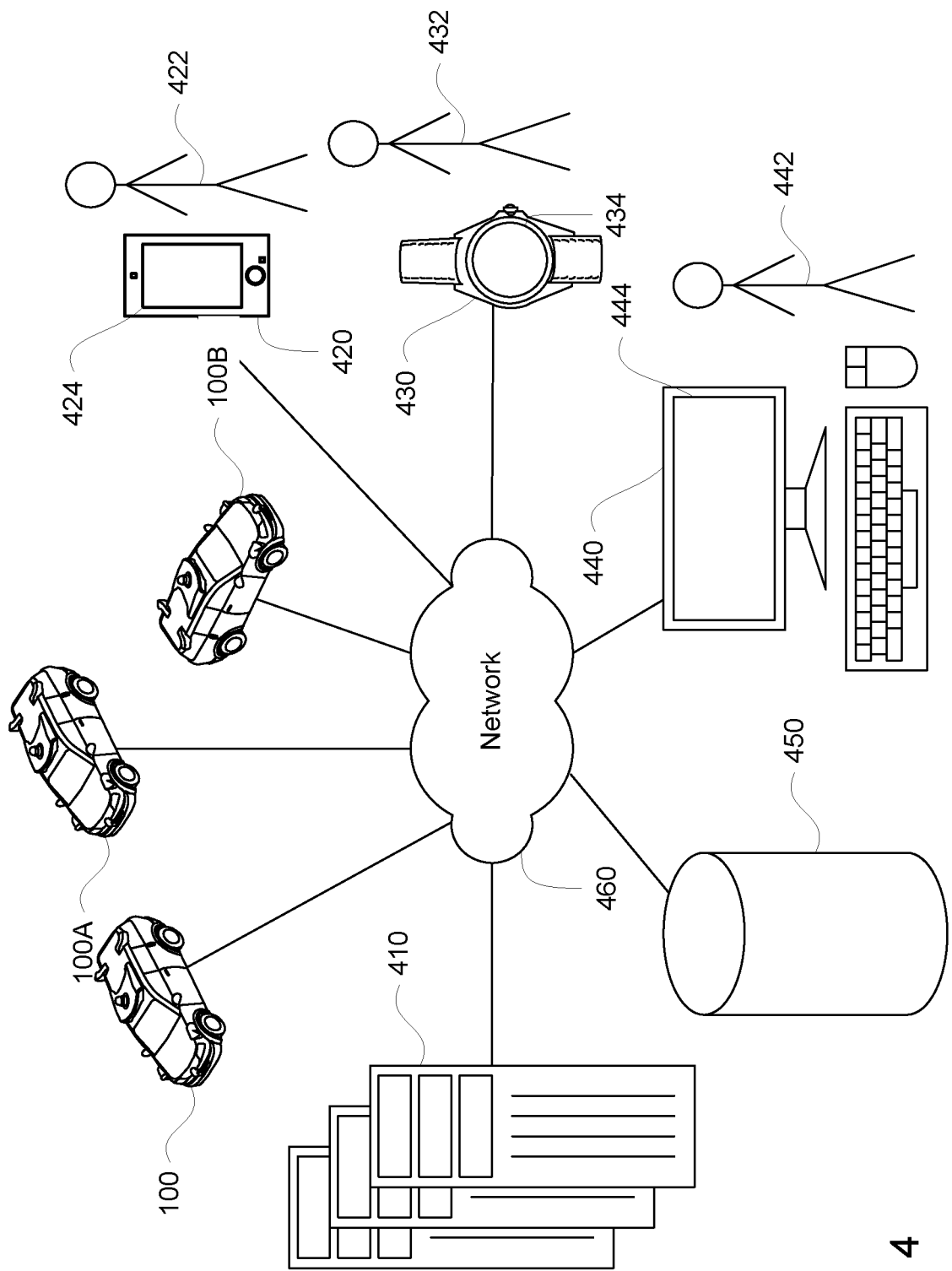
FIG. 4 is a pictorial diagram of an example system in accordance with aspects of the disclosure.
Figure 5:
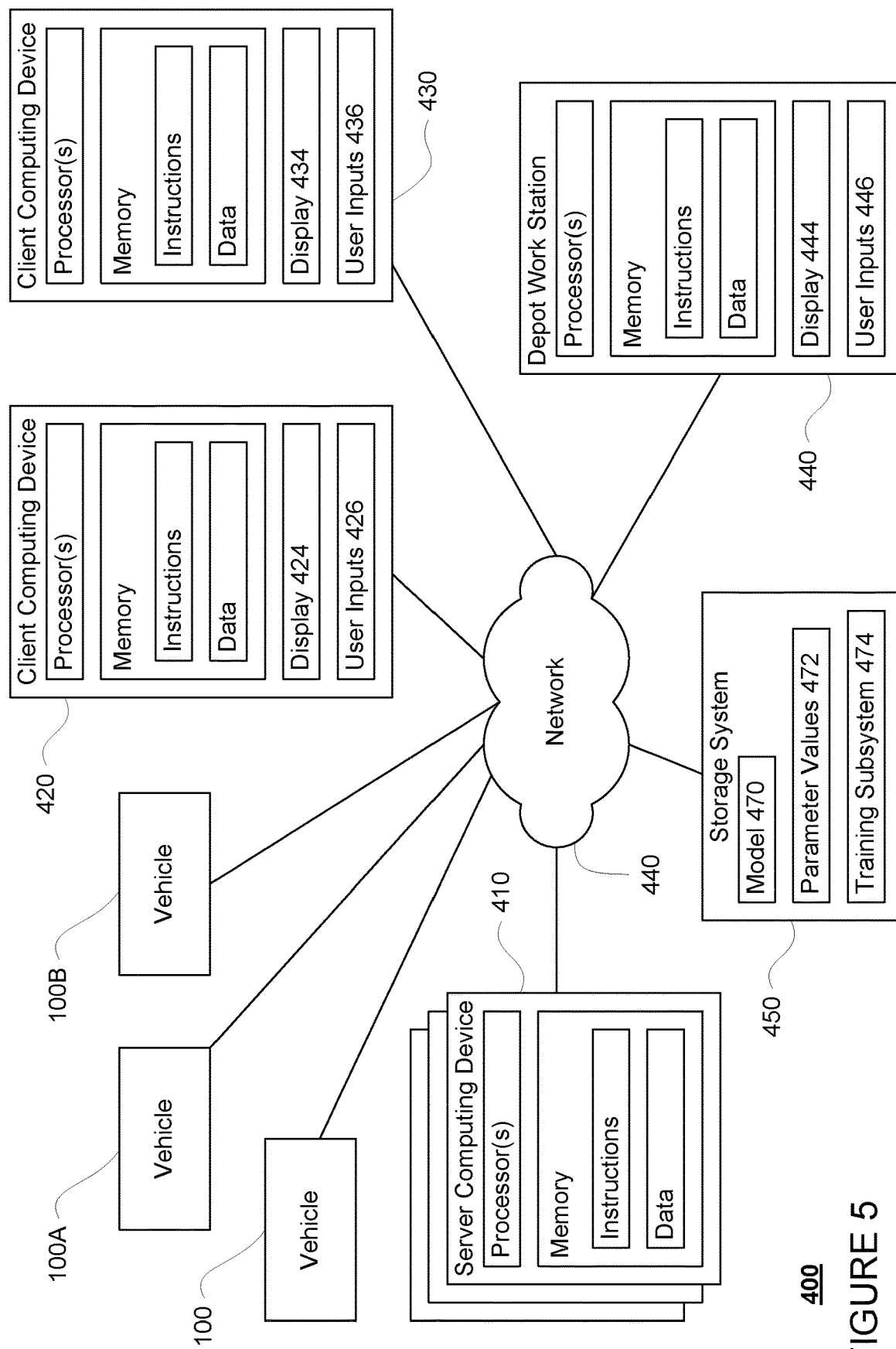
FIG. 5 is a functional diagram of the system of FIG. 2 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can send and receive information from the server computing devices 410. In addition, the server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. This information may be retrieved or otherwise accessed by a server computing device, such as one or more server computing devices 410, in order to perform some or all of the features described herein.

For instance, the storage system 450 may store sensor data 476 captured by a vehicle's perception system, such as perception system 172 of vehicle 100. The sensor data may include sensor data generated by one or more LIDAR sensors of a vehicle, such as a LIDAR sensor of dome housing 210 of vehicle 100. In this regard, the sensor data 476 may include LIDAR data points corresponding to the locations and intensity (or reflectivity) of surfaces off of which light generated by the LIDAR sensor is reflected back to LIDAR sensor.

This sensor data 476 may also include a plurality of images. This plurality of images may include images captured by a perception system of an autonomous vehicle in order to provide the most relevant context and orientation of signs that may appear in those images. For instance, the plurality of images may be images or frames captured by still and/or video cameras mounted on one or more vehicles such as vehicles 100 or 100A and uploaded via network 460 or otherwise sent to the storage system 450 for storage. Thus, the images may accurately reflect perception of the road and various objects from the perspective of the cameras or perception system of the vehicle. At least some of these images may be associated with labels and other information as discussed further below.

Each image may be associated with location information identifying the location and orientation from which the image was captured and/or more detailed information, such as geographic information for various surfaces within the image as determined from comparing with other images and/or from LIDAR sensor data captured by a LIDAR sensor of the perception system 172 contemporaneously with the image. For instance, as noted above, the LIDAR sensor data may include data points corresponding to the locations and intensity (or reflectivity) of surfaces off of which light generated by the LIDAR sensor is reflected back to LIDAR sensor. This information may be used to determine the correspondences of those surfaces in the camera images.

The storage system 450 as well as data 132 of vehicle 100 may store a copy of the aforementioned map information as well as one or more models 470 as well as model parameter values 472 for each such model. For instance, the storage system may store one or more models for detecting drivable road surfaces. A model 470 may include a classifier such as a neural network, a deep neural network, decision tree, boosting tree, etc. In addition, the storage system 450 may include a training subsystem 474 that can be used to train the model as discussed further below.

As with memory 130, storage system 450 can be of any type of computer storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to be able to use a model of the one or more models 470 to detect drivable road surfaces, the model may first be trained "offline" that is, ahead of time and/or at a remote computing device and thereafter sent to the vehicle 100 via network 460 and wireless network connections 156. For instance, one or more of server computing devices 410 may generate the model parameter values 472 by first retrieving training data from the storage system 450.

For instance, the one or more server computing devices 410 may retrieve the aforementioned map information 200 from the storage system 410. This map information may be the labeled ground truth information. As noted above and referring to FIGS. 2B and 2C, discrete portions of drivable road surfaces of the map, for instance corresponding to cells of a larger grid, may be labeled as such as well as with other information such as one or more potential driving direction of that surface, whether the surface could be an intersection or not, whether the surface is a normal driving lane, driveway, alley, crosswalk, etc. Because the model is trained on map information that is already labeled, there is a significant savings in terms of human labor time and cost to produce the training data.

The one or more server computing devices 410 may also retrieve the aforementioned sensor data 476 from storage system 450. This sensor data 476, for instance LIDAR sensor data and/or camera images may be projected into a projection grid corresponding to the grid cells of the map information in order to generate training data. In this regard, each grid cell of the projection grid will correspond to the geographic location of a grid cell of the map information. The projecting may be made based on the location information for the images and/or the location information for the data points of the LIDAR sensor data as well as the geographic location information for each grid cell, such as the grid cells of areas 260 and 262.

The projection grid and projected sensor data may be used as training input and the grid cells of the map information and associated labels may be used as training output. These training inputs and outputs may then be used to train the model to make predictions of drivable surfaces and other characteristics for a given cell and corresponding sensor data, for instance a projected camera image or LIDAR sensor data.

The model may be a "large-context" classifier for which input pixels (or cells) affect classified pixels (or cells) which are far away from the input location. Because the model 470 is trained on large sections or areas of the map information (i.e. a large receptive field), rather than discrete cells, the output of the model may be very contextual in nature, that is, the model may consider the relationships between cells when predicting the potential driving direction and type of surface for each cell. In this regard, the more cells, sensor data, and labels used to train the model, the more accurate the model parameter values 472 may become. At the same time, the more cells, sensor data, and labels used to train the model, the better at predicting the state of a lane of interest the model is likely to become.

The model may then be provided to one or more vehicles in order to allow the computing devices of those vehicles to make better informed driving decisions. For instance, the model 470 and model parameter values 474 may be sent to the computing devices 110 of vehicle 100, for instance via network 460, or by otherwise loading this information into the computing devices 110. This information may then be stored in the memory 130 of the computing devices 110 in order to allow the computing devices to use the model 470 to make driving decisions for the vehicle 100.

Figure 6:
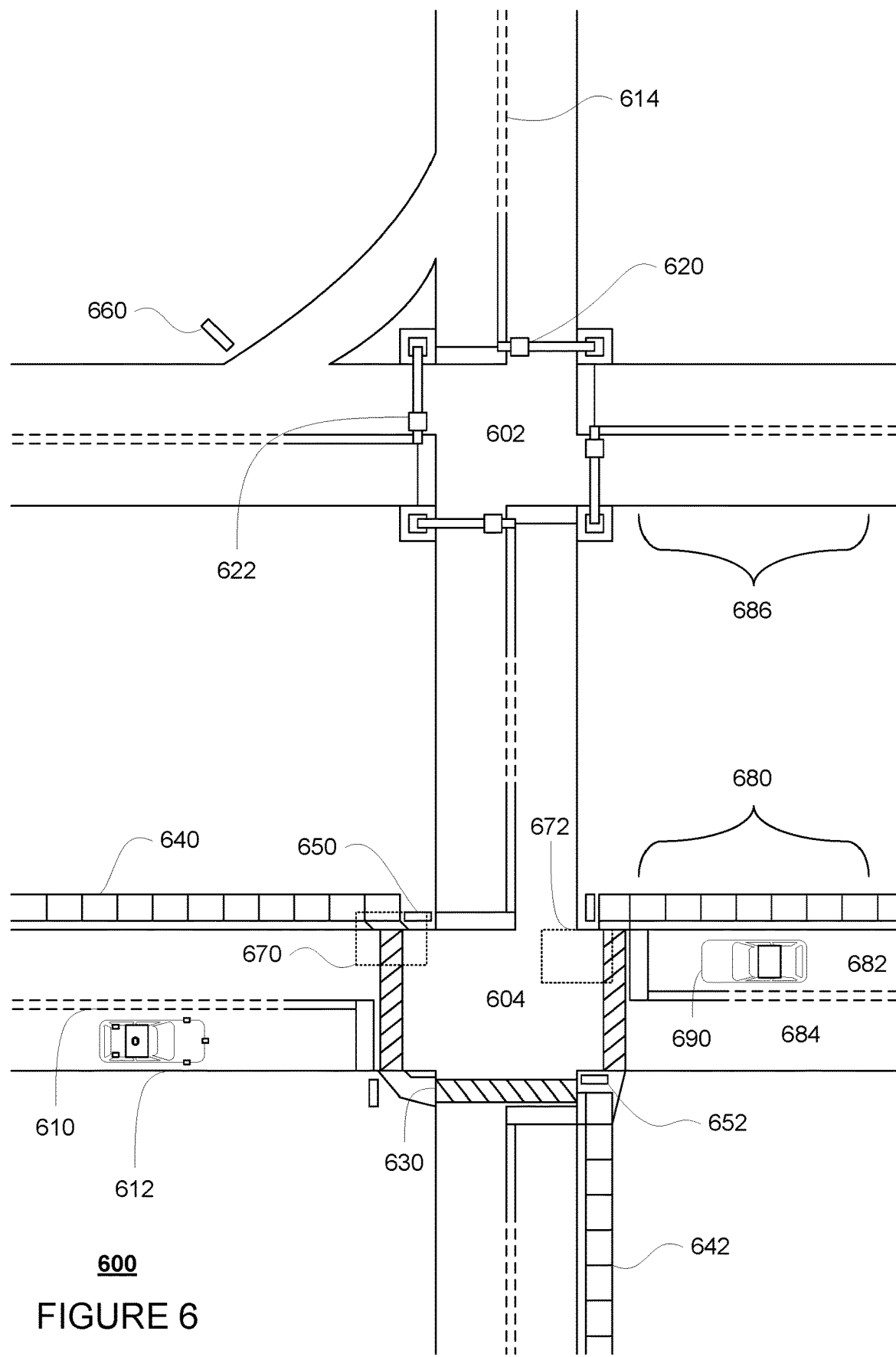
FIG. 6 is an example top down view of a geographic area in accordance with aspects of the disclosure.

As vehicle 100 drives around, perception system 172 captures sensor data of the vehicle's environment. For instance, LIDAR sensor data may be collected by a LIDAR sensor of the vehicle and/or camera images may be collected by cameras of the vehicle. FIG. 6 depicts vehicle 100 being maneuvered on a section of roadway 600 including intersections 602 and 604. In example 600 of FIG. 6, vehicle is approaching an intersection 602. In this example, intersections 602 and 604 correspond to the locations of intersections 202 and 204 of the map information 200, respectively. Similarly, lane lines 610, 612, and 614 correspond to the shape, location, and other characteristics of lane lines 210, 212, and 214, respectively. Similarly, crosswalk 630 corresponds to the shape, location, and other characteristics of crosswalk 230, respectively; sidewalks 640 correspond to sidewalks 240; traffic lights 620, 622 correspond to traffic lights 220, 222, respectively; stop signs 650, 652 correspond to stop signs 250, 252, respectively; and yield sign 660 corresponds to yield sign 260. However, each of intersections 602 and 604 now include additional drivable surfaces, here newly added roads 680 including lanes 682 and 684, and road 686 which do not appear in the map information. Such "new" roads and lanes can occur periodically in locations where there is new construction, such as new residential or commercial development projects, etc.

In order to determine whether there is any unmapped drivable surfaces, the collected sensor data may be projected by the computing devices 110 onto a projection grid corresponding to the grid of the map information. For instance, the grid cells of this projection grid may be a fixed value, such as 10, 15, 20, 25, 30, 35 cm or more or less, corresponding to the size and shape of the grid cells of the map information. In this regard, each grid cell of the projection grid may correspond to the location of a particular cell of the grid of the map information. For instance, the area of example 600 may be divided or otherwise arranged into a projection grid of cells having the same size, shape and locations as the grid of the map information 200. For illustration purposes areas 670 and 672 may correspond to the locations of areas 270 and 272

The projecting of the sensor data into the projection grid may be made based on the location information for the images and/or the location information for the data points of the LIDAR sensor data. Again, the location information for the images may include the location and orientation from which the image was captured and/or more detailed information, such as geographic information for various surfaces within the image as determined from comparing with other images and/or from LIDAR sensor data captured by a LIDAR sensor of the perception system 172 contemporaneously with the image. In this regard, each cell may include projected LIDAR sensor data, though in addition or alternatively, each cell may include projected portions of camera images.

Figure 7:
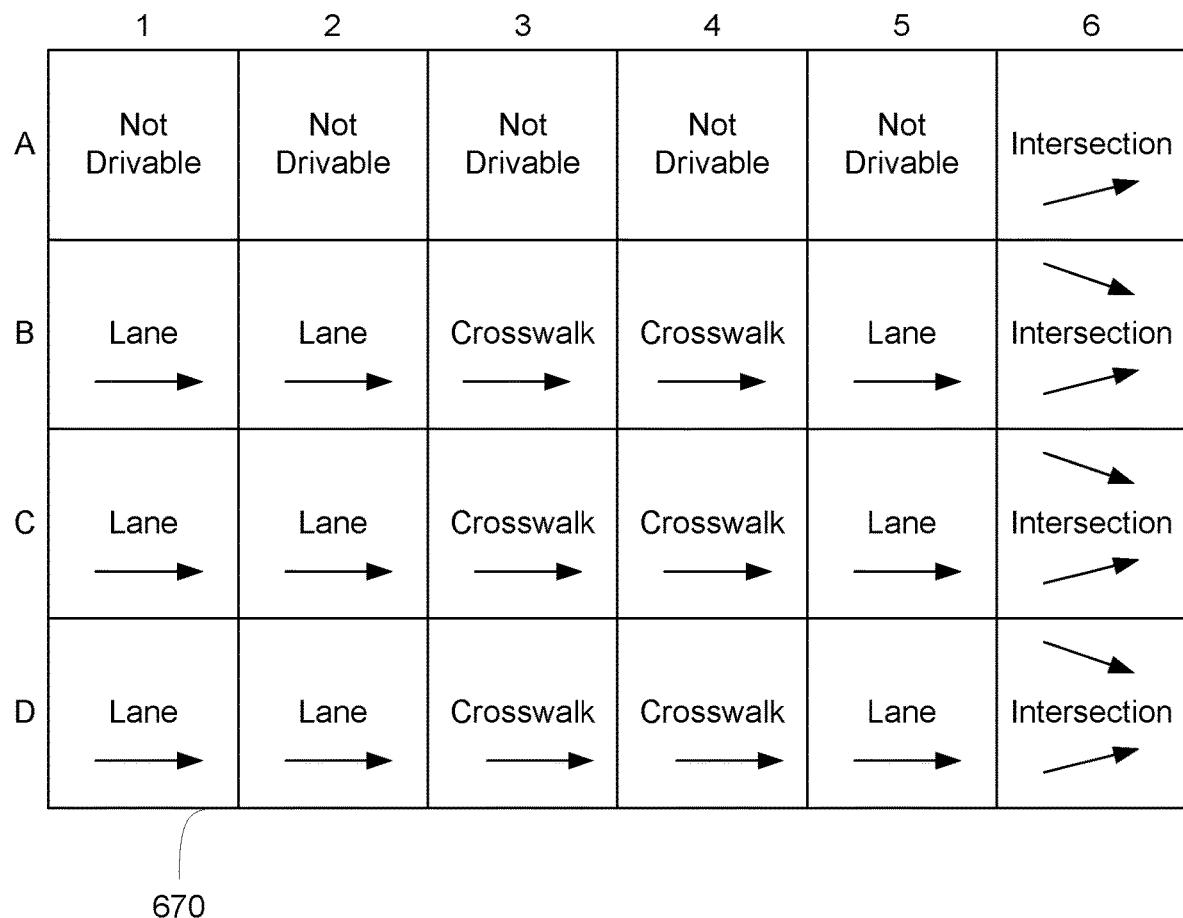
FIG. 7 is example data in accordance with aspects of the disclosure.
Figure 8:
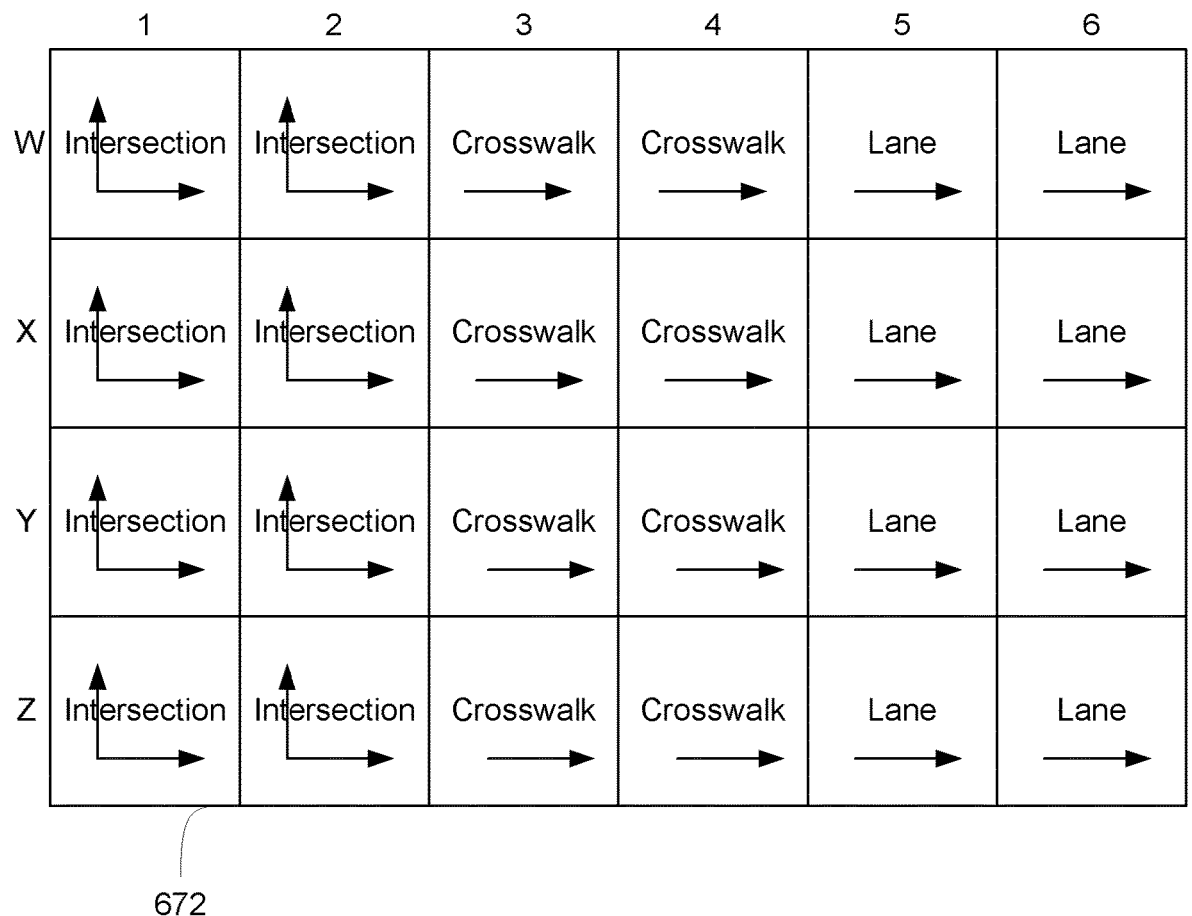
FIG. 8 is example data in accordance with aspects of the disclosure.

The grid cells and projected sensor data may be input into a model, such as model 470, by computing devices 110. As noted above, the model 470 classifies the cells of the grid as to whether or not the cell contains a drivable surface. The model may also classify the cells in other ways, such as one or more potential driving direction of that surface, whether the surface could be an intersection or not, whether the surface is a normal driving lane, driveway, alley, crosswalk, etc. FIG. 7 represents output classifications and grid cells from model 470 for the area 670 and FIG. 8 represents the output classifications and grid cells from model 470 for the area 672. As noted above area 670 corresponds to the area 270 of the map information 200, and area 672 corresponds to the area 272 of the map information. For each of these classifications, the model may also provide a confidence value for that classification.

Next, the output classifications and grid cells from the model 470 then be clustered and segmented. In this regard, the computing devices 110 may group together cells into larger regions with similar predictions of driving direction and type of surface. For instance, groups of adjacent cells predicted to be part of an intersection may be clustered together, groups of adjacent cells having a same or similar direction of travel may be clustered together, and so on. Turning to FIG. 7, grid cells B1, B2, C1, C2, D1, and D1 may be grouped or clustered together as belonging to a lane with a similar direction of travel. In addition, grid cells A6, B6, C6, and D6 may be grouped or clustered together as belonging to an intersection and grid cells B3, B4, C3, C4, D3, and D4 may be grouped or clustered together as belonging to a crosswalk. Turning to the example of FIG. 8, grid cells W1, W2, X1, X2, Y1, Y2, Z1, and Z2 may be grouped together as belonging to an intersection, grid cells W3, W4, X3, X4, Y3, Y4, Z3, and Z4 may be grouped together as belonging to a crosswalk, and grid cells W5, W6, X5, X6, Y5, Y6, 51, and Z6 lane with similar directions of travel In some instances, non-adjacent groups of grid cells may be clustered depending upon the confidence in the predictions. For instance, if the predictions of two cells being part of an intersection have a high confidence value, are of the same time, and there is a gap of a few cells between them, these cells may still be included in the same cluster. Similarly, if the predictions of these two cells being part of an intersection had a low confidence value, the cells would not be clustered based on those predictions (but could be based on other predictions).

If the number of cells in a given cluster would be too few, these clusters may be "ignored" or filtered. Whether a cluster is too small may be defined in square meters and maybe proportional to the number of cells squared. For instance, if the threshold is 25.0 meters^2 this may correspond to an area of 2,500 cells of a size of 10 cm^2. Stated otherwise: clusters which that would smaller than 25.0 meters^2 or, equivalently, 2,500 cells^2 may be ignored.

The clusters may be compared to the map to determine whether a drivable surface exists in the map with the same or similar labels at the location of the clustered cells. For instance, this stage may determine whether there is an overlap between the cells of the clusters and the labels of the corresponding region in the map. This overlap may be a complete or a partial overlap (i.e. a percentage of overlap). For instance, if there is a complete or very high percentage of overlap as between the examples of FIGS. 2B and 7, this may indicate no or very little change to the map. In the alternative, if there is no or a very low percentage of overlap as in the examples of FIGS. 2C and 8, this may indicate that the cluster is an unmapped drivable road surface. In this way, the sensitivity of the determination may be tuned by increasing or decreasing the percentage of overlap which would indicate an unmapped drivable road surface versus a previously mapped drivable road surface.

For any unmapped drivable road surfaces, the computing devices 110 may implement an appropriate reaction, for instance by changing the behavior of the vehicle 100. This may include, for instance, controlling the vehicle in an autonomous driving mode in order to slow down, stop, pull over, act more cautiously, etc. In addition, the computing devices 100 may also begin to search sensor data for the location of the unmapped drivable road surface in order to identify any vehicles that may be approaching the vehicle from the unmapped drivable road surface. For instance, returning to FIG. 6, the computing devices 110 may search the areas of lanes 682 and 684 for any vehicles, such as vehicle 690, which may have otherwise been unexpected or gone undetected.

In some instances where there is at least a partial though not complete overlap, this may indicate that a portion of the world is not accurately reflected in the map, though there may not actually be a completely unmapped drivable road surface. In this regard, the approach can also be used to detect changes related to map properties that are expressed as regions rather than curves such as lane markers or curbs. For instance, if there is a change to the location of a crosswalk, keep clear region, railroad crossing, parking lot, parking spaces, etc., such changes may be identified by the approach (assuming the model has been trained to label cells as such). In such cases, the computing devices of the vehicle may also need to change the behavior of the vehicle, for instance, in one or more of the ways discussed above.

In some instances, once an unmapped drivable road surface and/or a portion of the world is not accurately reflected in the map is identified, the computing devices 110 may send this information to other remote computing devices. For instance, the computing devices 110 may broadcast the information to other nearby autonomous vehicles, such as vehicles 100A or 100B, and/or send the information to server computing devices 410 in order to provide the information to other autonomous vehicles. This may also allow the server computing devices 410 to flag the location of the unmapped drivable road surface or portion of the world for further review and/or mapping efforts.

In addition, the autonomous vehicles computing devices can detect unmapped drivable road surfaces in the vehicle's vicinity even if those surfaces are not directly in the path of the vehicle. As such, a vehicle's computing devices may detect a new road before needing to react to that new road, such as if the new road is across a median, and can provide this information (as described above) to other vehicles before those vehicles are even required to traverse a region of the map information directly affected. This broader context is in contrast with simpler systems, such as a lane-keeping system, which can find that a vehicle needs to deviate from the map information where the vehicle is currently driving but does not monitor the broader area beyond the vehicle's current lane.

In addition to classifying drivable road surface, the aforementioned approach may also be used to provide other types of information. For instance, an unmapped drivable road surface may be identified as part of an intersection, even where the intersection is not yet completed (e.g. the intersection lacks lane markers and/or crosswalks on the border). This may indicate that there are other unmapped drivable surfaces, even if such other unmapped drivable surfaces are not yet detected. Similarly, an unmapped drivable road surfaces identified as part of a driveway, alley, etc, (which may be detectable just as a break in a road curb or barrier etc., as a break in a curb or lane markers) may imply an intersection. If such a break is detected, and the map does not indicate an intersection, that may then imply added drivable surface even if the drivable surface is not yet directly visible.

The model may be used by a vehicle's computing devices "full time" that is, to continuously detect unmapped drivable road surface. Alternatively, the model may be used "on demand" that is when the vehicle's computing devices have identified an unmapped or otherwise changed areas (areas that differ from the map information to a certain degree) using some other detection system in order to identify potentially unmapped drivable road surfaces.

In some instances, the model may also be used by other systems and not necessarily by autonomous vehicles in order to make real time driving decisions. That is, the model may be used by any vehicles, including non-autonomous vehicles, that are equipped with sensors configured to generate sensor data. This may increase the likelihood of detecting unmapped drivable road surfaces before those surfaces are encountered by autonomous vehicles.

Similarly, one or more server computing devices may also use the model to analyze sensor data collected and recorded previously by autonomous and/or non-autonomous vehicles in order to identify potentially unmapped drivable road surfaces. Moreover, because the server computing devices may have greater computing resources available to use the model, the model used by the server computing devices may be made even more sensitive to potentially unmapped drivable surfaces as compared to a model used by autonomous vehicles such as vehicle 100. For instance, when used by the vehicle, detecting an unmapped drivable road surface may cause a significant change in the vehicle's behavior. As such, being overly sensitive may cause the vehicle to overreact. In this regard, a more sensitive model may be used by the server computing devices in order to report even small or very uncertain surfaces without the consequence of overreaction, while at the same time allowing for human operators and/or other vehicles to review and capture sensor data for these surfaces so that the map information can be kept up to date.

Figure 9:
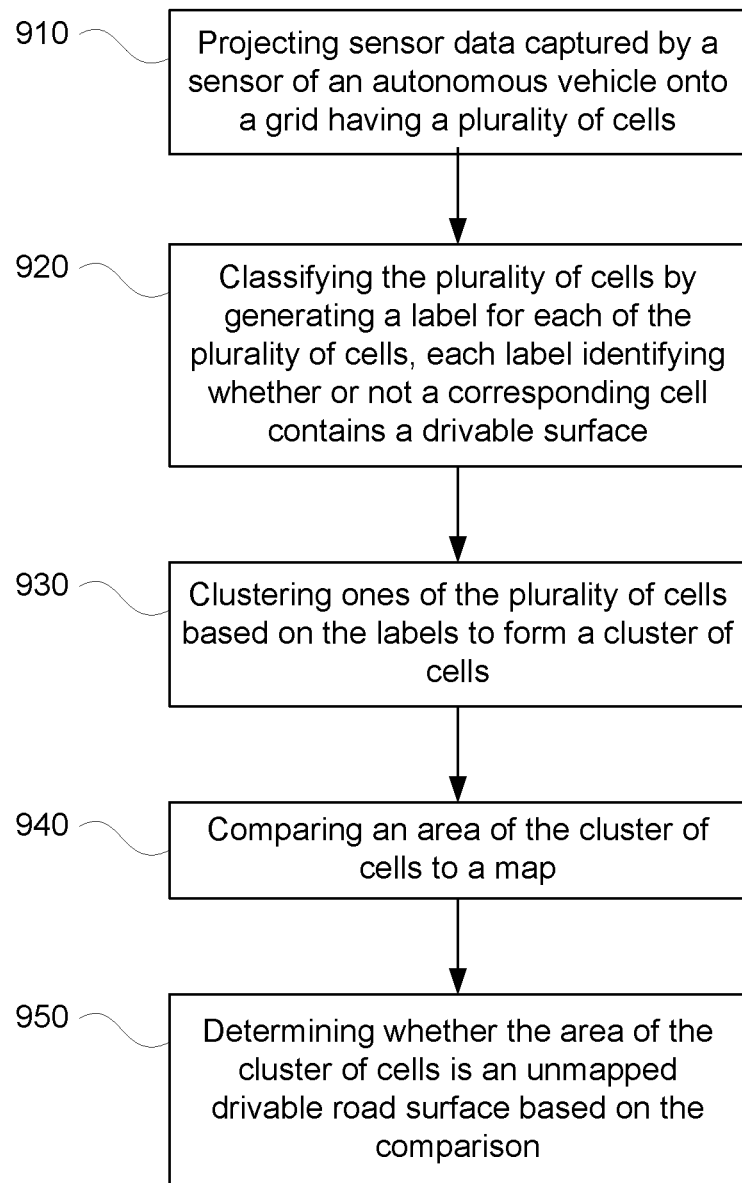
FIG. 9 is an example flow diagram in accordance with aspects of the disclosure.

FIG. 9 is an example flow diagram 900 in accordance with aspects of the disclosure which may be performed by one or more processors of one or more computing devices, such as processors 120 of computing devices 110, in order to detect unmapped drivable road surfaces. At block 910, sensor data captured by a sensor of an autonomous vehicle is projected onto a grid having a plurality of cells. At block 920, the plurality of cells is classified by generating a label for each of the plurality of cells, each label identifying whether or not a corresponding cell contains a drivable surface. At block 930, ones of the plurality of cells are clustered based on the labels to form a cluster of cells. At block 940, an area of the cluster of cells is compared to a map. At block 950, whether the area of the cluster of cells is an unmapped drivable road surface is determined based on the comparison.

The features described here provide a more robust approach for detecting unmapped drivable surfaces than simply looking for missing or moved map features. This, in turn, increases the safety and effectiveness of the vehicle's computing devices, as these devices make driving decisions related to an unmapped drivable road surface or a changed portion of the map. In addition, this approach allows an autonomous vehicle's computing devices to detect an unmapped drivable road surface and/or a changed portion of the map before the vehicle has actually reached these locations. Moreover, the approach also allows an autonomous vehicle's computing devices to make these determinations in real time and to share them with other vehicles, thereby increasing safety more generally.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of detecting unmapped drivable road surfaces, the method comprising:
    projecting, by one or more processors, sensor data captured by a sensor of an autonomous vehicle onto a grid having a plurality of cells;
    classifying, by the one or more processors, the plurality of cells by generating a label for each of the plurality of cells, each label identifying whether or not a corresponding cell contains a drivable surface;
    clustering, by the one or more processors, ones of the plurality of cells based on the labels to form a cluster of cells;
    comparing, by the one or more processors, an area of the cluster of cells to a map; and
    determining, by the one or more processors, whether the area of the cluster of cells is an unmapped drivable road surface based on the comparison.

2. The method of claim 1, wherein the sensor data includes LIDAR sensor data.

3. The method of claim 1, wherein the sensor data includes camera images.

4. The method of claim 1, wherein the classifying includes using a machine learning classifier to generate the labels.

5. The method of claim 1, further comprising classifying, by the one or more processors, the plurality of cells by generating a second label for each of the plurality of cells, each second label identifying one or more driving directions for a corresponding cell, and wherein the clustering is further based on the second labels.

6. The method of claim 1, further comprising classifying, by the one or more processors, the plurality of cells by generating a second label for each of the plurality of cells, each second label identifying whether a corresponding cell is part of an intersection, and wherein the clustering is further based on the second labels.

7. The method of claim 1, further comprising classifying, by the one or more processors, the plurality of cells by generating a second label for each of the plurality of cells, each second label identifying whether a corresponding cell is part of a driveway, and wherein the clustering is further based on the second labels.

8. The method of claim 1, further comprising classifying, by the one or more processors, the plurality of cells by generating a second label for each of the plurality of cells, each second label identifying whether a corresponding cell is part of a crosswalk, and wherein the clustering is further based on the second labels.

9. The method of claim 1, wherein the clustering further includes grouping adjacent cells to form the cluster based on the labels.

10. The method of claim 1, further comprising determining a confidence for each of the labels, and wherein the classifying is further based on the confidences.

11. The method of claim 10, wherein the clustering includes grouping together non-adjacent cells to form the cluster based on the confidences.

12. The method of claim 1, wherein the clustering includes ignoring one or more labels having confidence levels below a threshold when forming the cluster.

13. The method of claim 1, wherein the comparing includes determining an amount of overlap between the area of the cluster of cells and a region of the map having a label identifying whether or not a corresponding cell contains a drivable surface, and wherein determining whether the area of the cluster of cells is an unmapped drivable road surface is further based on the amount of overlap.

14. The method of claim 13, wherein when the amount of overlap is not a complete overlap, the area of the cluster of cells is determined to be an unmapped drivable road surface.

15. The method of claim 13, wherein when the amount of overlap is a complete overlap, the area of the cluster of cells is determined not to be an unmapped drivable road surface.

16. The method of claim 13, wherein when the amount of overlap is a partial overlap, the method further comprises determining that the area of the cluster of cells corresponds to a moved road feature.

17. The method of claim 1, further comprising using the determination to control an autonomous vehicle in an autonomous driving mode.

18. The method of claim 17, wherein controlling the autonomous vehicle using the determination includes changing a driving behavior of the autonomous vehicle.

19. The method of claim 17, further comprising sending the determination to other vehicles having autonomous driving modes.

20. The method of claim 1, further comprising using the determination as a signal that other unmapped drivable road surfaces may exist in an area proximate to the area corresponding to the area of the cluster of cells.

* * * * *